United States Patent
Ringstrom et al.

(10) Patent No.: US 9,030,954 B2
(45) Date of Patent: May 12, 2015

(54) REDUCING LOAD IN A COMMUNICATIONS NETWORK

(75) Inventors: Markus Ringstrom, Stockholm (SE); Ari Kangas, Lidingo (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 154 days.

(21) Appl. No.: 13/636,507

(22) PCT Filed: Mar. 24, 2010

(86) PCT No.: PCT/SE2010/050324
§ 371 (c)(1),
(2), (4) Date: Sep. 21, 2012

(87) PCT Pub. No.: WO2011/119080
PCT Pub. Date: Sep. 29, 2011

(65) Prior Publication Data
US 2013/0010633 A1     Jan. 10, 2013

(51) Int. Cl.
*H04W 52/32* (2009.01)
*H04W 52/24* (2009.01)
*H04W 52/12* (2009.01)
*H04W 52/14* (2009.01)

(52) U.S. Cl.
CPC ............ *H04W 52/325* (2013.01); *H04W 52/12* (2013.01); *H04W 52/146* (2013.01); *H04W 52/241* (2013.01)

(58) Field of Classification Search
None
See application file for complete search history.

(56) References Cited

U.S. PATENT DOCUMENTS

| 8,098,743 | B2 * | 1/2012 | Kuroda et al. | 375/252 |
| 2005/0083999 | A1 * | 4/2005 | Koo et al. | 375/148 |
| 2005/0152279 | A1 | 7/2005 | Robertson et al. | |
| 2008/0004030 | A1 * | 1/2008 | Frederiksen et al. | 455/450 |
| 2008/0318614 | A1 * | 12/2008 | Iizuka et al. | 455/522 |
| 2009/0143016 | A1 * | 6/2009 | Li | 455/63.1 |

(Continued)

FOREIGN PATENT DOCUMENTS

| EP | 2053758 A1 | 4/2009 |
| WO | 2009142572 A1 | 11/2009 |

OTHER PUBLICATIONS

European Communication issued in European Patent Application No. 10848563.2 on Jul. 23, 2013, 6 pages.

(Continued)

*Primary Examiner* — Robert Wilson
*Assistant Examiner* — Ronald h Davis
(74) *Attorney, Agent, or Firm* — Rothwell, Figg, Ernst & Manbeck P.C.

(57) ABSTRACT

Apparatus and method for reducing an air interface load in a communication network. A base station is provided with a receiver adapted to receive signals from a terminal via a Dedicated Physical Control Channel (DPCCH) and a second control channel. A measuring unit measures a signal to interference ratio (SIR) of the DPCCH. An effective SIR determining unit determines an effective SIR on the basis of the measured SIR of the DPCCH and an estimate of the SIR of the second control channel. A comparison unit compares the effective SIR with a target SIR, and a power determination unit determines a power control command for controlling power usage for the DPCCH on the basis of the comparison. A transmitter sends a message to the terminal, the message including the power control command. The invention allows the DPCCH power (or DPCCH SIR) operating point to be maintained at a low level.

20 Claims, 4 Drawing Sheets

(56) References Cited

U.S. PATENT DOCUMENTS

2010/0254292 A1* 10/2010 Kim et al. .................... 370/311
2011/0244905 A1* 10/2011 Burstrom et al. ............. 455/507
2012/0176998 A1* 7/2012 Muellner et al. ............. 370/329

OTHER PUBLICATIONS

Quddus, et al., "SIR Estimation on Common Pilot Channel with the Knowledge of Data to Pilot Power Ration for Closed Loop Power Control in WCDMA FDD Downlink", Vehicular Technology Conference, 2004, IEEE, vol. 2, pp. 865-856.

* cited by examiner

REDUCING LOAD IN A COMMUNICATIONS NETWORK

TECHNICAL FIELD

The invention relates the field of reducing load in a communications network.

BACKGROUND

Universal Mobile Telecommunications System (UMTS) is a 3rd Generation (3G) asynchronous mobile communication system operating in Wideband Code Division Multiple Access (WCDMA), Global System for Mobile communications (GSM) and General Packet Radio Services (GPRS).

FIG. 1 illustrates schematically a UMTS network 1 that comprises a core network 2 and a UMTS Terrestrial Radio Access Network (UTRAN) 3. The UTRAN 3 comprises a number of Radio Network Controllers (RNCs) 4, each of which is coupled to a set of neighbouring Node Bs 5. A Node B is effectively a Base Transceiver Station. Each Node B 5 is responsible for a given geographical cell and the controlling RNC 4 is responsible for routing user and signalling data between the Node B 5 and the core network 2. A User Equipment (UE) 6 communicates via a Node B 5 using a radio link, and it is desirable to improve speeds of communication over the radio link between the UE and the Node B.

Since the 1999 release of the basic 3GPP specifications for WCDMA, there have been several releases which improve on various aspects of that 1999 release. In release 5 of the WCDMA 3GPP specifications, high speed downlink packet access (HSPDA) was introduced to reduce downlink delays and increase downlink data rate capability by approximately a factor of three. Release 6 of the WCDMA 3GPP specifications also reduces uplink delays and increases uplink data rate capability by approximately a factor of two.

Release 6 introduced a new uplink transport channel called the Enhanced Dedicated Channel (E-DCH) targeted for interactive, background, and streaming traffic. Compared to the normal uplink DCH, the E-DCH achieves improved uplink performance using a short transmission time interval (TTI), hybrid ARQ with soft combining, and scheduling. Reducing the TTI allows for an overall reduction in delay and faster hybrid ARQ retransmissions. Fast hybrid ARQ with soft combining reduces the number of retransmissions as well as the time between retransmissions. It also allows for a significant increase in capacity. Fast scheduling allows for rapid resource reallocation between UEs 6, exploiting the "burst" properties of packet data transmissions. It also allows the system to admit a larger number of high data rate users and adapt rapidly to interference variations, thereby leading to an increase in capacity as well as an increase in the likelihood that a user will experience high data rates. The functionality for controlling retransmission delay for hybrid ARQ and fast scheduling is implemented in the Node B 5.

In the downlink HSPDA, the transmission power and the code space is the shared resource, but in the uplink E-DCH, the interference "headroom" is the amount of shared resource (i.e., transmit power or interference) left to be allocated to one or more mobile terminals to transmit in the uplink. This is realized in the form of spreading codes. Even though the spreading codes may be completely orthogonal in theory, a user always interferes with another user to some extent in reality. This is due to the fact that time shifts of the codes are not perfectly orthogonal. Furthermore, owing to time dispersion inherent in the radio channel, replicas of the time shifted signal will in most cases be received at the receiver side.

In a WCDMA uplink, each UE 6 has its own scrambling code. The scrambling codes consist of long sequences of pseudo-random chips. Cross-correlation properties of the scrambling codes ensure that any two scrambling codes are almost orthogonal, no matter the time shift. However, as mentioned above, they are never fully orthogonal. Consequently, a UE 6 transmitting data in the uplink will always interfere with all other users to some extent. This will ultimately set a limit on the number of UEs that can be supported in a cell, assuming a shared interference headroom. The amount of interference that a user generates as seen by another user is hence determined by the degree of non-orthogonality of the time shifted replicas of the scrambling codes, but also the power transmitted on the scrambling code.

In order to support many users, it is important to keep the interference as low as possible. As the orthogonality properties of the scrambling codes cannot be changed within the framework of the current 3GPP standard, it is necessary to keep the transmitted power as low as possible.

The common uplink resource shared among the UEs 6 is the total amount of tolerable interference, i.e., the total received power at the Node B 5. The amount of common uplink resources allocated to a UE 6 depends on the data rate (transport format) to be used. Generally, the higher the data rate, the larger the required transmission power/interference, and thus, the higher the resource consumption.

Scheduling is the mechanism that determines when a certain UE 6 is allowed to transmit, and at what maximum data rate. Packet data applications are typically bursty in nature with large and rapid variations in their resource requirements. The goal of the uplink scheduler is therefore to allocate a large fraction of the shared resource to users momentarily requiring high data rates, while at the same time ensuring stable system operation by avoiding sudden interference peaks. Identifying this goal is one thing; achieving it is another.

The uplink dedicated channels DCHs in WCDMA are "fast" power-controlled, meaning that the base station measures the received DPCCH signal quality, e.g., the received signal to interference ratio (SIR), and compares the measurement to a desired signal quality, e.g., a SIR target value. If the measured SIR is less than or equal to the SIR target, the Node B 5 signals an "up" power control command to the UE 6 to make the UE 6 increase the power by a predefined step, or a "down" power control command to the UE 6 to make it decrease its power by a predefined step if the received SIR is greater than the SIR target. The SIR target is regularly updated in a "slow" power control procedure known as outer loop power control (OLPC).

The WCDMA uplink typically comprises of several physical channels, examples of which include a Dedicated Physical Control Channel (DPCCH), a Dedicated Physical Data Channel (DPDCH), a High Speed Dedicated Physical Control Channel (HS-DPCCH), an Enhanced Dedicated Physical Control Channel (E-DPCCH) and an Enhanced Dedicated Physical Data Channel (E-DPDCH). It is not necessary for all channels of these channels to be present for a specific connection, but there is always one DPCCH present on each radio link. For a "pure" Enhanced uplink (EUL) Radio Access Bearer (RAB), there may be, for example, a DPCCH, an E-DPCCH and one or more E-DPDCH(s). The DPCCH comprises 10 bits per slot which are used as pilots for transmit power control (TPC) command, transport format combination indicator (TFCI) and feedback information (FBI), where the latter two are not always present. The pilot bits are used, among other things, for channel estimation and for determination of the SIR for the sake of power control of the uplink.

If there are few EUL UEs in the cell transmitting at a high data rate, these EUL UEs allocate most of the power to the E-DPDCH(s), and most of the interference experienced by other users comes from the power allocated to the E-DPDCH(s) of other users (neglecting own-interference such as ISI). However, in some cases the UEs transmit at a low or moderate rate. This may occur, for example, when the UE is using an email client. The client may send small signals once very 60 seconds or so to check for new emails. In this case, the power fraction that a UE allocates to the data channel (E-DPDCH(s)) decreases, and the power fraction that a user allocates to the control channels increases. Consequently, an increased fraction of the interference in the cell is a result of power transmitted on the control channels of other UEs. If there are many UEs in the cell, the interference from the control channels may dominate the total interference. In an extreme case, enough UEs may use an increased DPCCH power fraction that the interference headroom is consumed by the DPCCH of the active UEs. In that case, the scheduler is not able to give any UEs a grant to transmit user data on the E-DPDCH.

One way to reduce the interference of the DPCCH channel is the introduction of Continuous Packet Connectivity (CPC), as described in Release 7 of the 3GPP standard. This allows a UE to refrain from transmitting on the DPCCH when there is no user data to be transmitted on the E-DPDCH. However, in order to maintain synchronization, DPCCH bursts are still required on a regular basis. This causes interference. Furthermore, in the TTIs when user data is transmitted on the E-DPDCH, there is no benefit to using CPC, as transmissions are required on the DPCCH.

SUMMARY

It is an object of the invention to reducing load in a mobile radio communications network caused by interference from the DPCCH channel when a second control channel, such as an E-DPCCH, is also transmitting, particularly when a third channel, such as E-DPDCH, is transmitting.

According to a first aspect of the invention, there is provided a base station for use in a cellular radio communications network. The base station is provided with a receiver adapted to receive signals from a terminal via a Dedicated Physical Control Channel (DPCCH) and a second control channel. A measuring unit is provided that is adapted to measure a signal to interference ratio (SIR) of the DPCCH. An effective SIR determining unit is also provided, that is adapted to determine an effective SIR on the basis of the measured SIR of the DPCCH and an estimate of the SIR of the second control channel. A comparison unit compares the effective SIR with a target SIR, and a power determination unit determines a power control command for controlling power usage of the DPCCH on the basis of the comparison. A transmitter is used for sending a message to the terminal, the message including the power control command. The invention allows the DPCCH power (or DPCCH SIR) operating point to be maintained at a low level for HSPA users, for a whole range of data rates. This increases the capacity of the network, and allows more HSPA users to be admitted in the cell.

The effective SIR determining unit is optionally arranged to determine an effective SIR on the basis of the measured SIR of the DPCCH and the amplitude relation of the DPCCH and the second control channel.

As an option, the measuring unit is arranged to measure the amplitude relation of the DPCCH and the second control channel, although predetermined values of the amplitude relation could be used. The base station may alternatively or additionally be provided with a memory for storing a received amplitude relation of the Dedicated Physical Control Channel and the second control channel.

The effective SIR determining unit is optionally arranged to apply weighting factors to the measured SIR of the DPCCH and an estimate of the SIR of the second control channel. Examples of weighting factors that may be used include any of data rates, scheduling grants, transport format combination indicators, and empirically determined constants.

According to a second aspect of the invention, there is provided a node for use in a cellular radio communications network. The node comprises a receiver adapted to receive information from which a target SIR of a DPCCH between a terminal and a base station can be determined. A processor is also provided that is adapted to determine a new target SIR on the basis of the target SIR of a DPCCH and an estimate of a SIR of a second control channel between the terminal and the base station. The new target SIR is for use in controlling power between the base station and the terminal.

The node optionally further comprises a transmitter for sending the new target SIR to a base station.

As an option, the node comprises one of a base station and a Radio Network Controller.

The estimate of the SIR of the second control channel is optionally derived from an amplitude relation of the DPCCH and the second control channel.

According to a third aspect of the invention, there is provided a method of reducing air interface load between a terminal and a base station in a cellular radio communications network. The method comprises, at a base station, receiving signals from a terminal via a DPCCH and a second control channel. The base station measures a SIR of the DPCCH, and determines an effective SIR on the basis of the measured SIR of the DPCCH and an estimate of the SIR of the second control channel. The effective SIR is compared with a target SIR, and power control command for DPCCH is determined on the basis of the comparison. A message is sent to the terminal, the message including the power control command.

According to a fourth aspect of the invention, there is provided a method of reducing air interface load between a terminal and a base station in a cellular radio communications network. According to the method, a node receives information from which a target SIR of a DPCCH between a terminal and a base station can be determined and determines a new target SIR on the basis of the target SIR of the DPCCH and an estimate of a SIR of a second control channel between the terminal and the base station. As an option, the method further comprises sending the target SIR to a base station for use in power control of signalling between the terminal and the base station.

According to a fifth aspect of the invention, there is provided a computer program comprising computer readable code which, when run on a base station, causes the base station to behave as a base station as described above in the first aspect of the invention.

According to a sixth aspect of the invention, there is provided a computer program comprising computer readable code which, when run on a node, causes the node to behave as a node as described above in the second aspect of the invention.

According to a seventh aspect of the invention, there is provided a computer program product comprising a computer readable medium and a computer program as described above in either of the fifth or sixth aspects of the invention, wherein the computer program is stored on the computer readable medium.

DETAILED DESCRIPTION

Figure 1:
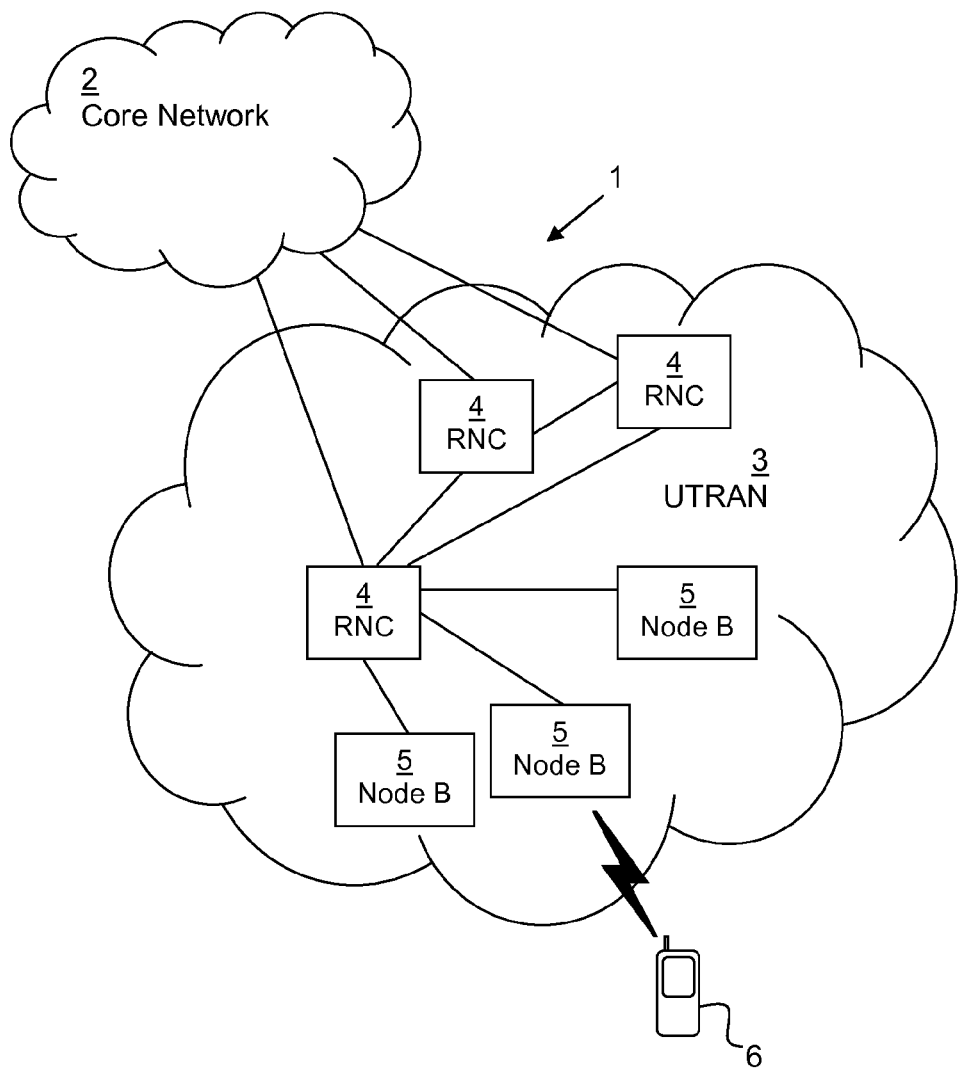
FIG. 1 illustrates schematically in a block diagram a UMTS network.

It is desirable to reduce the interference of the DPCCH channel, especially in cases where a UE is transmitting on the uplink at a low or moderate rate. The description below assumes a WCDMA network with a UE communicating on an uplink with a Node B, the Node B being controlled by a RNC. However, it will be appreciated that the invention is equally applied to other types of network where a terminal communicates with a Radio Base Station (RBS). For example, the invention may be applied to other types of communication network such as Long Term Evolution (LTE), CDMA and Time Division Multiple Access (TDMA).

In a HSPA scenario, it may be required to support many UEs that need to use the uplink with the Node B with data rates ranging from zero to high rates. As described above, in order to support many UEs, it is necessary to keep the interference from the control channels (DPCCH) to a low level.

E-DPCCH boosting, described in Release 7 of the 3GPP standard, is intended to aid detection of large transport blocks required for high data rates. However, it has been realised that E-DPCCH symbols may be used to obtain a channel estimation for smaller transport blocks, and for situations in which E-DPCCH power is not boosted.

By utilizing both the E-DPCCH and the DPCCH for channel estimation, the effective SIR can be increased. Currently, the DPCCH SIR is constantly measured in the Node B 5 and power control commands are issued from the Node B 5 to the UE 6 based on the measured SIR and a SIR target that is stored at the Node B 5 (and may be determined by the RNC 4 and provided to the Node B 5). A problem improving the SIR estimate where an E-DPCCH channel is also used is that the effective SIR varies depending on whether E-DPCCH is currently transmitting signalling. It will be realised that the effective SIR will be higher during TTIs where the E-DPCCH is transmitting signalling.

As described above, the E-DPCCH transmits signalling in the TTIs in which data is also transmitted using the E-DPDCH. However, the Node B still needs to perform power control during TTIs in which there is no data being transmitted using the E-DPDCH. For these TTIs, the effective SIR, representing the channel conditions with E-DPCCH aided channel estimation, is not directly measurable. However, it has been realised that the effective SIR, taking into account the E-DPCCH, can be estimated based on the amplitude relation between the DPCCH and the E-DPCCH. This is possible since the interference affecting the DPCCH is very similar to the interference affecting the E-DPCCH due to the properties of the spreading codes.

In a first embodiment, the amplitude relation (note that the square of the amplitude ratio gives the power ratio between the two channels) are already known by the Node B 5 as the ratio of the beta factors $\beta_{ec}/\beta_c$, where $\beta_{ec}$ is the amplitude ratio of the E-DPCCH and $\beta_c$ is the amplitude ratio of the DPCCH. In another embodiment, the amplitude relation is measured by the Node B in the TTIs where both DPCCH and E-DPCCH are transmitting signalling.

Once the effective SIR based on the DPCCH and the E-DPCCH has been estimated, it can then be used for ILPC, and the power instructions transmitted from the Node B 5 to the UE 6 will allow for a lower interference from the DPCCH between the Node B 5 and the UE 6.

One way to calculate the effective SIR is given in Equation 1:

$$SIR_{effective} = SIR_{chan\ est} = SIR_{DPCCH} + SIR_{E-DPCCH} \qquad (1)$$

$SIR_{DPCCH}$ is the DPCCH SIR, and $SIR_{E-DPCCH}$ is the SIR calculated similarly to the $SIR_{DPCCH}$ but based on the E-DPCCH symbols. $SIR_{chan\ est}$ is the SIR representative for channel estimation. The values are on a linear scale rather than a logarithmic scale. As mentioned above, $SIR_{E-DPCCH}$ cannot be measured directly as it may not be transmitting in each TTI. However, it can be approximated using the known amplitude relation. The effective SIR can therefore be estimated using Equation 2:

$$SIR_{effective} = SIR_{chan\ est} = (1 + (\beta_{ec}/\beta_c)^2) \times SIR_{DPCCH} \qquad (2)$$

$\beta_{ec}$ and $\beta_c$ are the amplitude ratios of the E-DPCCH and DPCCH respectively. The estimated effective SIR quantity is subsequently used for ILPC in all TTIs, both when E-DPCCH is transmitting signalling and when it is not. ILPC is performed by comparing the estimated effective SIR with a target SIR.

It should be noted that the E-DPCCH does not include true pilot bits, but rather coded information that needs to be demodulated and in some cases decoded before E-DPCCH symbols can be used to assist channel estimation.

Equation 2 above provides an estimate of the effective SIR using the amplitude relations of the channels, but it is possible to refine the estimate by introducing correction factors depending on specific circumstances and taking into account $SIR_{DPCCH}$ and $SIR_{chan\ est}$, as described in Equation 3.

$$SIR_{effective} = \alpha SIR_{DPCCH} + \gamma SIR_{chan\ est} = (\alpha + \gamma(1+(1+(\beta_{ec}/\beta_c)^2))) \times SIR_{DPCCH} \qquad (3)$$

Where $\alpha$ and $\gamma$ may be functions of, for example, E-DCH Transport Format Combination Identifier (E-TFCI), beta factors, or alternatively $\alpha$ and $\gamma$ may be constants.

Again, $SIR_{effective}$ is used for ILPC by comparing $SIR_{effective}$ with the SIR target at the Node B 5.

Figure 2:
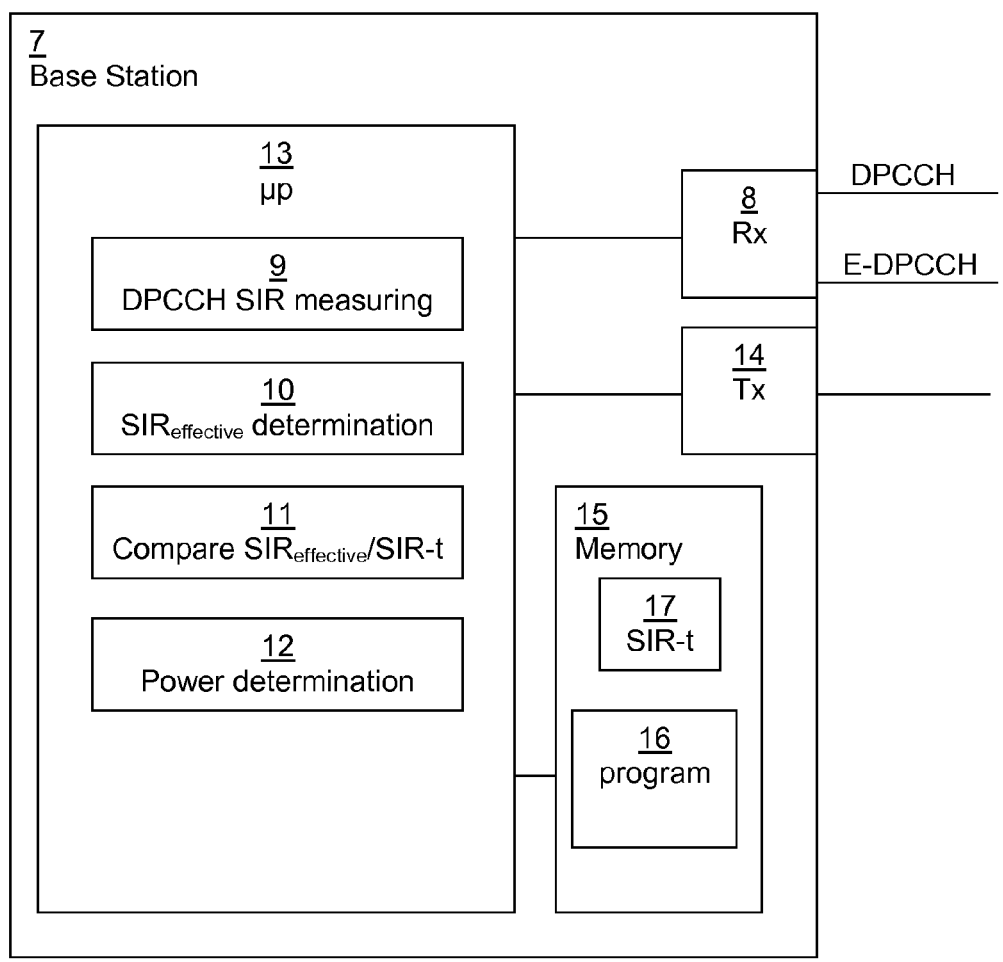
FIG. 2 illustrates schematically in a block diagram a base station for use in a cellular radio communications network according to an embodiment of the invention.

Referring to FIG. 2 herein, there is illustrated schematically a base station 6 such as a Node B. The base station 6 is provided with a receiver 7 for receiving signals from a UE 6 a DPCCH and an E-DPCCH. The receiver 7 is illustrated as a single unit in FIG. 2, although it will be appreciated that different receivers may be used, or the receiver may be embodied in a transceiver. A processor 13 is provided for performing functional tasks. These functional tasks are illustrated as an $SIR_{effective}$ measuring unit 9 for determining $SIR_{effective}$, as described above. A comparison unit 10 is provided for comparing the $SIR_{effective}$ with the target SIR. A power determination unit 12 is provided for performing ILPC and determining an allowable power usage for the DPCCH from the UE 6 on the basis of the comparison. A transmitter 14 is provided for sending a message to the UE 6 informing the UE 6 of the allowable power usage.

A computer readable medium in the form of a memory 15 may be provided. This can be used to store a program 16 for execution by the processor 13, which would in effect give rise to the units 9, 10, 11 and 12 described above. The memory 15 may also be used to store the target SIR 17. The memory 15 may be used to store other information. For example, the base station 6 may be provided with the amplitude relation of the control channels, in which case the amplitude relation may be stored in the memory 15.

Figure 3:
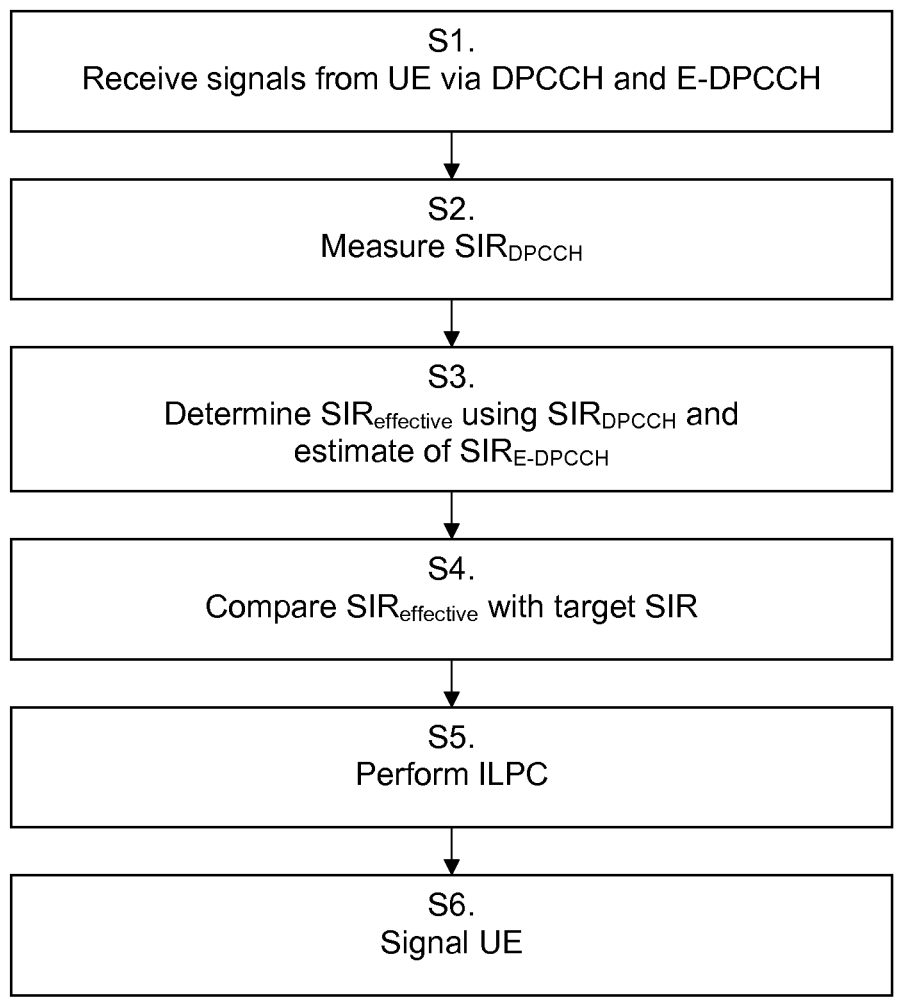
FIG. 3 is a flow diagram showing the steps of an embodiment of the invention.

FIG. 3 is flow diagram illustrating the steps of this embodiment of the invention. The following numbering corresponds to the numbering of FIG. 3.

S1. Base station 7 receives signals from UE 6 via the DPCCH and the E_DPCCH.
S2. The base station 7 measures $SIR_{DPCCH}$.
S3. The base station 7 determines $SIR_{effective}$ using the measured $SIR_{DPCCH}$ and an estimate of $SIR_{E\text{-}DPCCH}$, as described above. This may use measured or previously known amplitude ratios, and/or other factors such as α and γ, as described in Equation 3.
S4. The base station 7 compares $SIR_{effective}$ with the target SIR.
S5. IPLC is performed by the base station 7 on the basis of the comparison, in order to determine an allowable DPCCH power usage for the UE 6.
S6. The base station 7 sends a message to the UE 6 informing the UE 6 of the allowable DPCCH power usage.

In an alternative embodiment to those described above, the Node B 5 or a RNC 4 determines a new target SIR (SIR-t) that is based on an estimate of the power usage of the E-DPCCH. This is then compared with the measured $SIR_{DPCCH}$ for ILPC in order to perform power control. The new target SIR (SIR-$t_{NEW}$) can be derived as follows:

The existing SIR-t, assuming steady state, is given by Equation 4.

$$\text{SIR-t} = SIR_{DPCCH} \quad (4)$$

SIR-$t_{NEW}$ can be determined using an estimate of the effective SIR of the DPCCH and E-DPCCH (Equation 5).

$$\text{SIR-}t_{NEW} = SIR_{effective} \quad (5)$$

As described above in Equation 3, $SIR_{effective}$ can be estimated using correction factors α and γ, and so SIR-$t_{NEW}$ can be expressed as shown in Equation 6.

$$\text{SIR-}t_{NEW} = \alpha SIR_{DPCCH} + \beta SIR_{E\text{-}DPCCH} \quad (6)$$

$SIR_{E\text{-}DPCCH}$ can be estimated using the amplitude ratios, as described in Equation 2, and so SIR-$t_{NEW}$ can be expressed as shown in Equation 7.

$$\text{SIR-}t_{NEW} = \alpha SIR_{DPCCH} + \gamma(1+(\beta_{ec}/\beta_c)^2)SIR_{DPCCH} \quad (7)$$

Equation 7 can be reduced as shown in Equation 8:

$$\text{SIR-}t_{NEW} = [\alpha + \gamma(1+(\beta_{ec}/\beta_c)^2)]SIR_{DPCCH} \quad (8)$$

Combining Equations 8 and 4 gives a value of SIR-$t_{NEW}$ based on the existing SIR-t that takes into account the SIR of the E-DPCCH, as shown in Equation 9.

$$\text{SIR-}t_{NEW} = [\alpha + \gamma(1+(\beta_{ec}/\beta_c)^2)]\text{SIR-}t \quad (9)$$

SIR-$t_{NEW}$ may be determined by the RNC 4 serving the Node B 5, and so SIR-t can be calculated by the RNC 4 and provided to the Node B 5 served by the RNC. In this way, the behaviour of the Node B 5 is unchanged from its current behaviour, making the invention easier to apply to existing mobile radio communication networks. It will be appreciated that SIR-$t_{NEW}$ need not necessarily be determined using $\beta_{ec}$ and $\beta_c$, but could instead use other factors to estimate $SIR_{E\_DPCCH}$.

Figure 4:
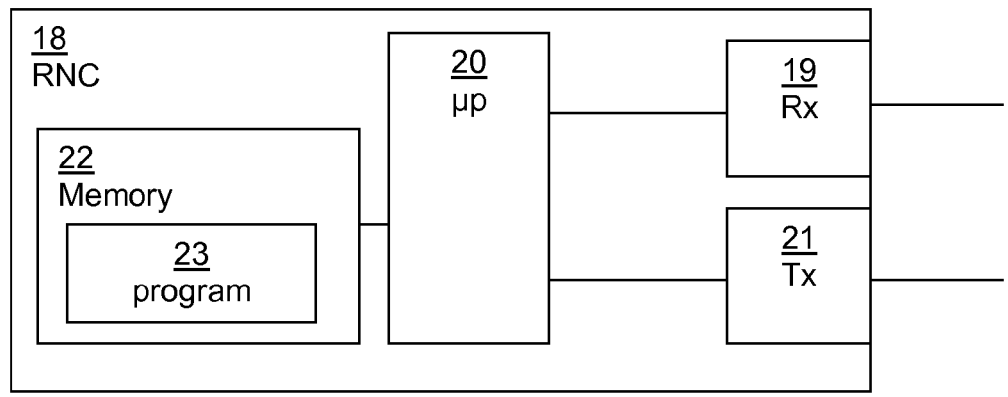
FIG. 4 illustrates schematically in a block diagram a Radio Network Controller for use in a cellular radio communications network according to a further embodiment of the invention.

Referring to FIG. 4 herein, there is illustrated a RNC 18, although it will be appreciated that the same functionality could be implemented in a base station such as a Node B. The RNC 18 is provided with a receiver 19 for receiving information from which $SIR_{DPCCH}$ can be determined. A processor 20 is provided for making a determination of SIR-$t_{NEW}$, as described above. A transmitter 21 is also provided for sending SIR-$t_{NEW}$ to a base station for use in ILPC. A computer readable medium in the form of a memory 22 may also be provided, on which to store a computer program 23 which, when executed on the processor 20, causes the processor to perform the functions described above.

Figure 5:
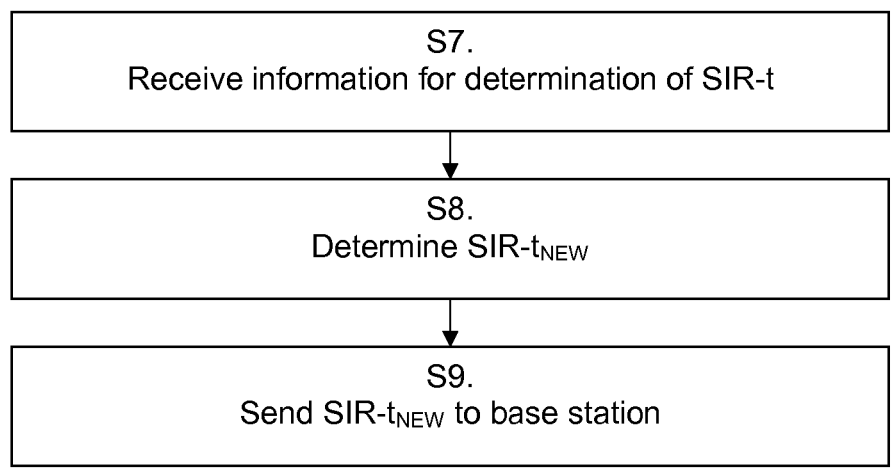
FIG. 5 is a flow diagram showing the steps of the further embodiment of the invention.

FIG. 5 is flow diagram illustrating the steps of this embodiment of the invention. The following numbering corresponds to the numbering of FIG. 5.

S7. The RNC 18 receives information allowing it to determine SIR-t.
S8. The RNC 18 determines SIR-$t_{NEW}$, as described above.
S9. The RNC 18 sends SIR-$t_{NEW}$ to a base station for use in ILPC.

The present invention relies on using the E-DPCCH for channel estimation. This in turn may require adequate channel estimates of the DPCCH. Hence, it may be beneficial to complement the ILPC algorithm with a minimum DPCCH SIR level to ensure an accurate estimation of the E-DPCCH SIR.

The invention allows the DPCCH power (or DPCCH SIR) operating point to be maintained at a low level for HSPA users, for the whole range of data rates. This increases the capacity of the network, and allows more HSPA users to be admitted in the cell.

It will be appreciated by the person of skill in the art that various modifications may be made to the above-described embodiments without departing from the scope of the present invention. In particular, the invention may be applied in any type of communications network.

The following abbreviations are used in the above description:

3G 3rd Generation
CDMA Code Division Multiple Access
CPC Continuous Packet Connectivity
DCH Dedicated Channel
DPCCH Dedicated Physical Control Channel
DPDCH Dedicated Physical Data Channel
E-DCH Enhanced Dedicated Channel
E-DPCCH Enhanced Dedicated Physical Control Channel
E-DPDCH Enhanced Dedicated Physical Data Channel
E-TFCI E-DCH Transport Format Combination Identifier
EUL Enhanced Uplink
FBI feedback information
GPRS General Packet Radio Services
HS-DPCCH High Speed Dedicated Physical Control Channel
HSPA High Speed Packet Access
HSPDA High Speed Downlink Packet Access
ILPC inner loop power control
ISI Inter-symbol interference
LTE Long Term Evolution
OLPC outer loop power control
RAB Radio Access Bearer
RBS Radio Base Station
RNC Radio Network Controllers
SIR signal to interference ratio
TDMA Time Division Multiple Access
TFCI transport format combination indicator
TPC transmit power control
TTI transmission time interval
UE User Equipment
UMTS Universal Mobile Telecommunications System
UTRAN UMTS Terrestrial Radio Access Network
WCDMA Wideband Code Division Multiple Access

The invention claimed is:

1. A base station for use in a cellular radio communications network, the base station comprising:
   a receiver configured to receive signals from a terminal via a Dedicated Physical Control Channel and a second control channel;
   a measuring unit configured to measure a signal to interference ratio of the Dedicated Physical Control Channel;
   an effective signal to interference ratio determining unit configured to determine an effective signal to interference ratio on the basis of the measured signal to interference ratio of the Dedicated Physical Control Channel and an estimate of the signal to interference ratio of the second control channel;
   a comparison unit configured to compare the effective signal to interference ratio with a target signal to interference ratio;
   a power determination unit configured to determine a power control command for controlling power usage of the Dedicated Physical Control Channel on the basis of the comparison; and
   a transmitter configured to send a message to the terminal, the message including the power control command.

2. The base station according to claim 1, wherein the effective signal to interference ratio determining unit is arranged to determine an effective signal to interference ratio on the basis of the measured signal to interference ratio of the Dedicated Physical Control Channel and the amplitude relation of the Dedicated Physical Control Channel and the second control channel.

3. The base station according to claim 2, wherein the measuring unit is arranged to measure the amplitude relation of the Dedicated Physical Control Channel and the second control channel.

4. The base station according to claim 2, further comprising a memory for storing an amplitude relation of the Dedicated Physical Control Channel and the second control channel.

5. The base station according to claim 1, wherein the effective signal to interference ratio determining unit is arranged to apply weighting factors to the measured signal to interference ratio of the Dedicated Physical Control Channel and an estimate of the signal to interference ratio of the second control channel.

6. The base station according to claim 5, wherein the weighting factors are selected according to any of data rates, scheduling grants, transport format combination indicators, and empirically determined constants.

7. The base station of claim 1, wherein the effective signal to interference ratio determining unit is configured to determine the effective signal to interference ratio by calculating a weighted sum of the signal to interference ratio of the Dedicated Physical Control Channel and the estimate of the signal to interference ratio of the second control channel.

8. The base station of claim 7, wherein the effective signal to interference ratio determining unit is configured to calculate the estimate of the signal to interference ratio of the second control channel as a function of the signal to interference ratio of the Dedicated Physical Control Channel.

9. The base station of claim 7, wherein the effective signal to interference ratio determining unit is configured to apply a same weight to the signal to interference ratio of the Dedicated Physical Control Channel and to the estimate of the signal to interference ratio of the second control channel in calculating the weighted sum.

10. A node for use in a cellular radio communications network, the node comprising:
    a receiver configured to receive information from which a target signal to interference ratio of a Dedicated Physical Control Channel between a terminal and a base station can be determined;
    a processor configured to determine a new target signal to interference ratio on the basis of the target signal to interference ratio of a Dedicated Physical Control Channel and an estimate of a signal to interference ratio of a second control channel between the terminal and the base station, the new target signal to interference ratio for use in power control between the base station and the terminal.

11. The node according to claim 10, further comprising a transmitter for sending the new target signal to interference ratio to a base station.

12. The node according to claim 10, wherein the node comprises one of a base station and a Radio Network Controller.

13. The node according to claim 10, wherein the estimate of the signal to interference ratio of the second control channel is derived from an amplitude relation of the Dedicated Physical Control Channel and the second control channel.

14. The node of claim 10, wherein the processor is configured to determine the new target signal to interference ratio by calculating a weighted sum of the target signal to interference ratio of the Dedicated Physical Control Channel and the estimate of the signal to interference ratio of the second control channel.

15. The node of claim 14, wherein the processor is configured to calculate the estimate of the signal to interference ratio of the second control channel as a function of the target signal to interference ratio of the Dedicated Physical Control Channel.

16. A method of reducing air interface load between a terminal and a base station in a cellular radio communications network, the method comprising:
    at a base station, receiving signals from a terminal via a Dedicated Physical Control Channel and a second control channel;
    measuring a signal to interference ratio of the Dedicated Physical Control Channel;
    determining an effective signal to interference ratio on the basis of the measured signal to interference ratio of the Dedicated Physical Control Channel and an estimate of the signal to interference ratio of the second control channel ;
    comparing the effective signal to interference ratio with a target signal to interference ratio;
    determining a power control command for controlling power usage for the Dedicated Physical Control Channel on the basis of the comparison; and
    sending a message to the terminal, the message including the power control command.

17. A method of reducing air interface load between a terminal and a base station in a cellular radio communications network, the method comprising:
    at a node, receiving information from which a target signal to interference ratio of a Dedicated Physical Control Channel between a terminal and a base station can be determined;
    determining a new target signal to interference ratio on the basis of the target signal to interference ratio of the Dedicated Physical Control Channel and an estimate of a signal to interference ratio of a second control channel between the terminal and the base station.

18. The method according to claim 17, further comprising sending the target signal to interference ratio to a base station for use in power control of signalling between the terminal and the base station.

19. A computer program product comprising a non-transitory computer readable medium storing a computer program comprising computer readable code which, when run on a base station, causes the base station to behave as a base station as claimed in claim 1.

20. A computer program product comprising a non-transitory computer readable medium storing a computer program comprising computer readable code which, when run on a node, causes the node to behave as a node as claimed in claim 10.

* * * * *

UNITED STATES PATENT AND TRADEMARK OFFICE
CERTIFICATE OF CORRECTION

PATENT NO. : 9,030,954 B2
APPLICATION NO. : 13/636507
DATED : May 12, 2015
INVENTOR(S) : Ringström et al.

Page 1 of 1

It is certified that error appears in the above-identified patent and that said Letters Patent is hereby corrected as shown below:

On the Title Page, in item (12), in Column 1, below "United States Patent", delete "Ringstrom" and insert -- Ringström --, therefor.

On the Title Page, in item (75), under "Inventors", in Column 1, Line 1, delete "Ringstrom" and insert -- Ringström --, therefor.

On the Title Page, in item (75), under "Inventors", in Column 1, Line 2, delete "Lidingo" and insert -- Lidingö --, therefor.

In the Specification

In Column 1, below Title, insert -- CROSS-REFERENCE TO RELATED APPLICATION
This application is a 35 U.S.C. § 371 National Phase Entry Application from PCT/SE2010/050324, filed March 24, 2010, and designating the United States, the disclosure of which is incorporated by reference herein. --.

In Column 7, Line 43, delete "SIR-$t_{NEW}=\alpha SIR_{DPCCH}+\beta SIR_{E\text{-}DPCCH}$" and insert -- SIR-$t_{NEW} = \alpha\, SIR_{DPCCH} + \gamma\, SIR_{E\text{-}DPCCH}$ --, therefor.

Signed and Sealed this
Eighth Day of March, 2016

Michelle K. Lee
*Director of the United States Patent and Trademark Office*